May 16, 1961 A. J. BECK 2,984,027
EARTHMOVING SCRAPER WITH IMPROVED APRON CONTROL
Filed March 27, 1959
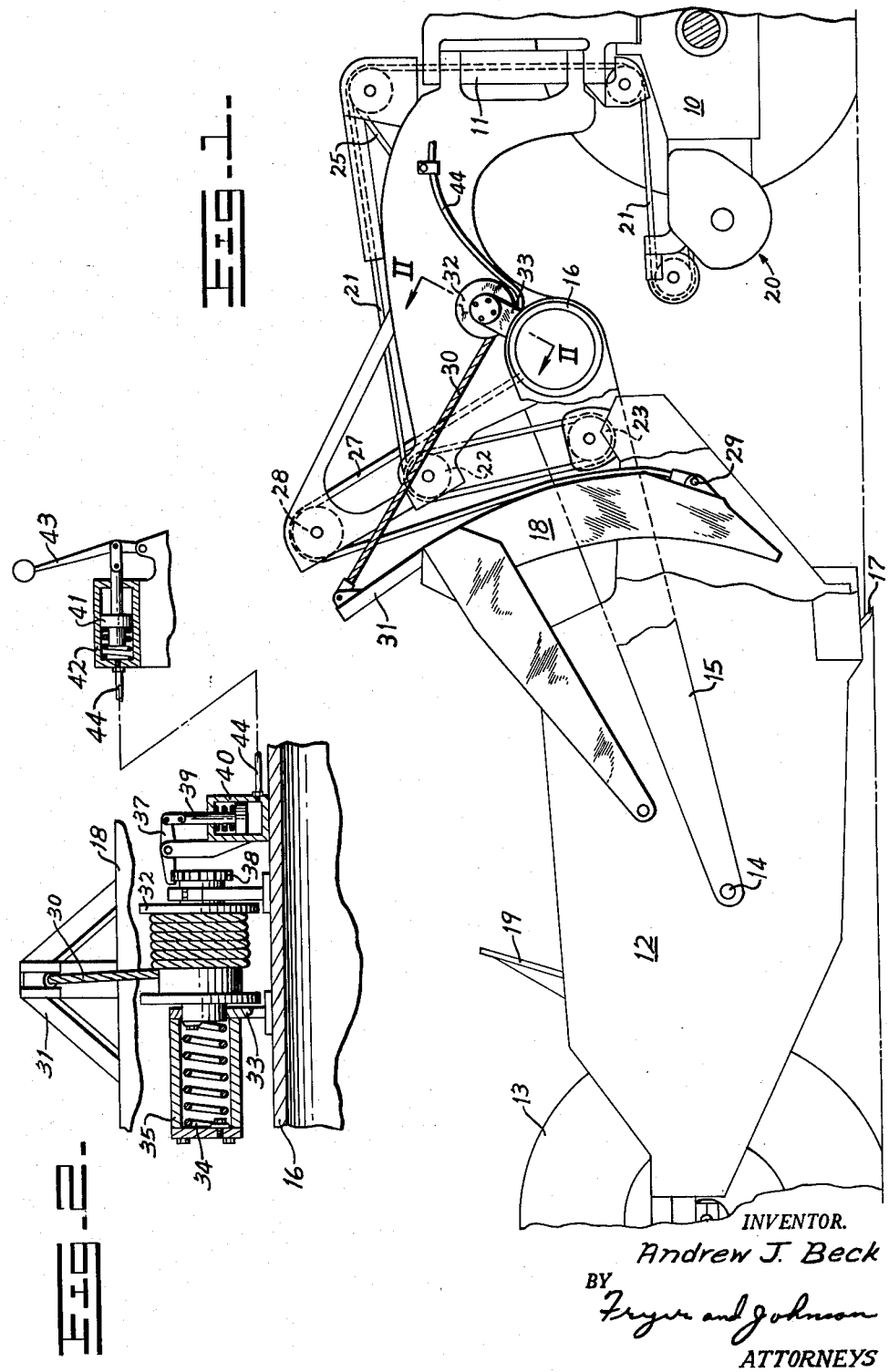
INVENTOR.
*Andrew J. Beck*
BY
*Fryer and Johnson*
ATTORNEYS

2,984,027

EARTHMOVING SCRAPER WITH IMPROVED APRON CONTROL

Andrew J. Beck, Peoria, Ill., assignor to Caterpillar Tractor Co., Peoria, Ill., a corporation of California Filed Mar. 27, 1959, Ser. No. 802,562

3 Claims. (Cl. 37—129)

This invention relates to earthmoving scrapers and particularly to control mechanism for a cable operated apron which is employed for closing the open front end of the scraper bowl.

The invention relates to so-called cable actuated scrapers, a typical example of which is found in the United States patent to W. P. Kimsey et al., No. 2,852,870, for "Two Speed Scraper Apron." This type of scraper comprises a large bowl or body member with a draft connection to a tractor unit. The bowl is provided with a scraper edge forwardly of its bottom and may be lowered to bring the scraping edge into contact with the ground to effect collection of earth which is deposited in the bowl as it advances. The front of the bowl which is normally open for the collection of earth is provided with a gate-like device usually referred to as an apron which can be swung downwardly or closed during transportation of a load and which is opened to permit discharge of the load by an ejector positioned in the rear of the bowl and adapted to be moved forwardly. The operations of raising and lowering the bowl, advancing the ejector and raising the apron are controlled by cables leading to winches on the tractor and under control of the operator of the tractor. The apron is raised by such a cable but lowering of the apron for closing the forward end of the bowl prior to transporting the collected earth is effected by gravity. This gives rise to difficulty when the scraper is operating in loose soils such as sand, shale or gravel because the force of gravity is often insufficient to effect complete closing of the apron when it is obstructed by earth and much of the load in the bowl is lost as the bowl is raised. Furthermore, in some cases, a mound of loose earth is pushed ahead of the scraper bowl cutting edge and engages the apron forcing it upwardly and creating an even greater opening and greater loss of earth from the bowl as it is raised.

Attempts to overcome the foregoing difficulties and to improve the operation of a cable actuated scraper apron have been made through the use of such devices as hydraulic jacks and positive apron closing means including an electric motor. Such devices are, however, costly and complicated.

It is the object of the present invention to provide a simple and inexpensive mechanism for improving the operation of earthmoving scrapers and particularly to overcome the disadvantages related above by providing better and more positive control of a cable actuated scraper apron. The manner in which this object is accomplished, as well as further objects and advantages of the invention is set forth in the following specification where reference is made to the accompanying drawing.

In the drawing:

Fig. 1 is a view in side elevation of a cable actuated scraper embodying the present invention, parts being broken away for the purpose of clarifying the disclosure, and Fig. 2 is a sectional view of a portion of the apron control mechanism taken on the line II—II of Fig. 1 and also showing an operator's control member associated therewith.

A conventional cable operated two-wheel scraper is shown in Fig. 1 as articulately connected to the rear of a tractor, a small portion of which is shown at 10 as by a king pin 11. The scraper comprises a bowl 12 supported at its rear end as by wheels 13 and having pivotal connections, one of which is shown at 14 with draft arms 15 supported at opposite ends of a tubular cross member 16 all forming a part of the draft frame.

The scraper bowl 12 has a cutting edge 17 adjacent its forward open end adapted to be lowered into cutting position with respect to the ground. A pivoted apron 18 is lowered to a position closing the front of the scraper bowl for transporting earth in the bowl and an ejector, a portion of which is shown at 19 is adapted to move forwardly to eject the earth from the bowl when the apron is open. Adjustment of the various parts described above is made through cables which are wound upon and payed off from winches, generally indicated at 20 at the rear of the tractor, powered by a suitable power takeoff shaft, all in the manner disclosed in Patent No. 2,852,870 referred to above. While the operation of the cables need not be here described in detail for an understanding of the present invention, there is, as can be seen in Fig. 1, one cable 21 leading from one of the winches 20 up through the center of the king pin 11 and thence over sheaves 22 and 23, the latter of which is on the bowl 12 so that taking in of the cable 21 raises the bowl which is lowered by gravity when the cable is payed out.

A second cable 25 parallels the first cable from another of the winches 20 up through the king pin and then leads downwardly into the tubular cross member 16 wherein through mechanism, not shown, it effects raising of the apron 18 and advancing of the ejector 19 in that sequence, the ejector moving forwardly only after the apron is fully raised. A cable leading from the mechanism within the member 16 is shown at 27 as trained over a sheave 28 and connected with the apron as at 29 for raising the apron when the cable is taken in. The apron, like the bowl, descends only by gravity and it is because of this that it is sometimes not fully closed when the bowl is full and being raised to its transport position. To overcome this difficulty, the present invention provides an additional cable or tag line 30 fixed at one end to the apron 18 through the medium of an upstanding frame 31 thereon, as also shown in Fig. 2, and having its other end secured to and wound about a drum 32 fixed to the cross member 16 for rotation in brackets 33. The drum 32 is loaded as by a torsion spring 34 in a housing 35 secured to one of the brackets for rotation in a direction which causes winding of the cable 30 upon the drum when the apron 18 is lowered. The drum may be latched against rotation by a pivoted latch 37 adapted to engage, as in the position shown in Fig. 2, with notches in the periphery of a disc 38 fixed to the drum 32 for rotation therewith. The latch 37 is normally released permitting rotation of the drum so that slack in the cable 30 is prevented. Engagement of the latch is accomplished by a piston 39 in a slave cylinder 40 which responds to the action of a piston 41 in a master cylinder 42. The master cylinder is disposed at the operator's station on the tractor which pulls the scraper in a position for convenient access and operable by a hand lever 43. A conduit 44 connects the master and slave cylinders for the communication of actuating fluid between them.

In operation, when the bowl 12 has been filled with earth and is ready to be transported, the operator can, by engaging the latch 37, prevent rotation of the drum 32 thereby preventing upward movement of the apron 18 as it engages a mound of earth in front of it. This will retain it against upward movement when the bowl 12 is raised and, since power is applied through the cable 21 for raising the bowl while the apron is held downwardly by the cable 30, the apron is forceably closed. Since in practice the apron is in a partially lowered position during loading of the bowl, it may be latched in this position throughout the loading cycle and released only at the end of the haul where it becomes necessary to open the apron before ejecting the earth from the bowl.

I claim:

1. In an earthmoving scraper or the like which includes a draft frame, an earth receiving bowl connected to the frame, an apron to close the forward side of said bowl, means to raise the bowl, and means including a cable to raise the apron and to permit it to be lowered to a closed position by gravity, the improvement which comprises, an extensible connection between the apron and the draft frame, and means to latch said connection against extension whereby the apron can be closed by raising the bowl.

2. In an earthmoving scraper or the like which includes a draft frame, an earth receiving bowl connected to the frame, an apron to close the forward side of said bowl, means to raise the bowl, means including a cable to raise the apron and to permit it to be lowered to a closed position by gravity, the improvement which comprises, an extensible connection between the apron and the draft frame, and means to latch said connection against extension whereby the apron can be closed by raising the bowl, and a remote control for actuating the latch means.

3. In an earthmoving scraper or the like which includes a draft frame, an earth receiving bowl connected to the frame, an apron to close the forward side of said bowl, means to raise the bowl, means including a cable to raise the apron and to permit it to be lowered to a closed position by gravity, the improvement which comprises a cable extending between the apron and draft frame, a spring wound drum receiving one end of the cable to hold it taut upon raising and lowering of the apron, latch means to prevent rotation of the drum, and a remote control for actuating the latch means.

References Cited in the file of this patent

UNITED STATES PATENTS

| | | |
|---|---|---|
| 2,648,920 | Anderson | Aug. 18, 1953 |
| 2,852,870 | Kimsey | Sept. 23, 1958 |

FOREIGN PATENTS

| | | |
|---|---|---|
| 554,208 | Italy | Jan. 9, 1957 |